United States Patent [19]

Robinson et al.

[11] 4,129,270
[45] Dec. 12, 1978

[54] AIR REFUELING BOOM PIVOT GIMBAL ARRANGEMENTS

[75] Inventors: Ronald H. Robinson, Bellevue; Richard H. Weiland, Seattle, both of Wash.

[73] Assignee: The Boeing Company, Seattle, Wash.

[21] Appl. No.: 806,029

[22] Filed: Jun. 13, 1977

[51] Int. Cl.² ............................................. B64D 39/00
[52] U.S. Cl. ................................. 244/135 A; 141/387
[58] Field of Search ........... 244/135 R, 135 A, 137 R, 244/137 A, 138 R, 136, 88; 141/387, 388, 279

[56] References Cited

U.S. PATENT DOCUMENTS

| 2,663,523 | 12/1953 | Leisy | 244/135 A |
|---|---|---|---|
| 2,859,002 | 11/1958 | Leisy | 244/135 A |
| 2,960,295 | 11/1960 | Schulze | 244/135 A |
| 3,067,972 | 12/1962 | Mosher | 244/135 A |
| 3,091,419 | 5/1963 | Mosher | 244/135 A |
| 4,072,283 | 2/1978 | Weiland | 244/135 A |

FOREIGN PATENT DOCUMENTS

| 55640 | 12/1943 | Netherlands | 141/387 |
|---|---|---|---|
| 695200 | 8/1953 | United Kingdom | 244/135 A |

Primary Examiner—Galen L. Barefoot
Attorney, Agent, or Firm—H. Gus. Hartmann; Bernard A. Donahue

[57] ABSTRACT

An aerial refueling boom utilized in the transfer of fuel from a tanker airplane to a receiver airplane and more particularly, to the boom geometry or gimballing which comprises an axis fixed with respect to structure of the tanker airplane about which the boom rotates in elevation and an inclinable axis about which the boom rotates for lateral movement. The angle of inclination of the boom lateral motion pivot axis or azimuth axis varies with respect to the longitudinal axis of the airplane axis as the boom is changed in elevation angle. A pair of aerodynamic surfaces formed into a Vee and known as ruddevators are mounted towards the trailing end of the boom for flying the boom about these axes. The ruddevators are part of a control system which includes a pantographing cable system for automatically changing the angle-of-attack of the aerodynamic surfaces and for alleviating the air loads imposed by the receiver airplane when it is imparting the movement of the boom during the refueling engagement. The boom support system includes articulation which provides for combining a certain amount of boom rolling action with sideward movement of the boom and varies the ratio between the degree of roll motion vs. the degree of azimuth, as the boom is raised and lowered during changes in elevational angles while operating within the normal ranges of the refueling disconnect envelope.

20 Claims, 9 Drawing Figures

AIR REFUELING BOOM PIVOT GIMBAL ARRANGEMENTS

BACKGROUND OF THE INVENTION

In an aerial tanker airplane used by the military known as the Boeing KC-135, a flying refueling boom is supported from the airplane about a fixed vertical axis for free pivotal movement in a sideward direction or in azimuth; and the boom is also supported for free pivotal movement about a lateral axis for up and down movement or in elevation. The means for moving the boom about these axes, comprises a pair of aerodynamic surfaces formed into a Vee and known as ruddevators. When the ruddevators are moved collectively to a negative angle-of-attack, the boom will be moved downwardly; and a differential change in the angle-of-attack of the ruddevators will move the boom sidewardly.

Included in the ruddevator control system is a pantographing cable system, similar to that of a drafting machine, which functions to automatically position the ruddevators when the boom is moved by other than the boom operator's control stick; e.g., when engaged with a receiver airplane, and the receiver airplane moves the boom in elevation, the ruddevators will automatically pantograph collectively. Also, when the receiver airplane pulls the boom off to one side, the ruddevators will pantograph differentially. This aids in alleviating the additional air loads that would be imposed on the boom and ruddevators as a result of the boom being displaced without any control input from the boom operator, if the pantographing system were not utilized.

The present aerial tankers like the Boeing 747, the Boeing 707, and the Boeing KC-135, as well as the previous tankers like the Boeing KC-29 and KC-97, have used a flying boom type of aerial refueling with considerable success. However, limitations in the aerodynamic performance of that known boom become apparent when it is used at the ever increasing speeds and altitudes required to refuel the modern high speed military aircraft. In order to provide a flying boom system of aerial refueling that would permit fuel transfer between the tanker airplane and the receiver airplane, at the air speeds and altitudes desirable for receiver airplanes, there must be adequate aerodynamic control forces available from the airfoil surfaces activating the boom, in order to position it throughout a spaced envelope large enough for the receiver airplane to remain within, with a reasonable effort on the part of the pilot of the receiver airplane and the boom operator.

The limiting factor in the refueling envelope size is the boom disconnect envelope, i.e. sufficient aerodynamic ruddevator control force must exist to permit a safe extraction of the boom nozzle from the receiver receptacle beyond the normal limits of the refueling envelope. For the present known tanker airplanes like the Boeing 747, the Boeing 707, and the Boeing KC-135, the increase in airspeed or Mach number of the tanker airplane to that desired for optimum refueling of the future inventory receiver airplanes, could reduce the boom maneuvering envelope to the point where the refueling operation would be compromised; e.g., if due to restrictions on the operation of the boom, the refueling operation requires that it be done at lower airspeeds, a considerable loss in altitude as well as true airspeed would be necessary for the receiver airplane. The range of the receiver aircraft would be degraded since additional fuel is consumed in returning to cruise airspeed and altitude after refueling. This also results in increased vulnerability of both aircraft to enemy interception as well as the more severe weather conditions at the lower altitudes which could complicate the rendezvous and refueling hook-up operation.

One of the inherent aspects of the present known KC-135 boom ruddevator control system, is that when the boom is moved all the way over to one side of the azimuth envelope, there is quite a bit of air drag generated by the boom; and this results in an increase in the aerodynamic control force requirements of the ruddevators in maintaining that extreme azimuth position. Also, at this extremity of the azimuth envelope, the wake flow from the boom partially blanks out the air flow over one of the ruddevators, reducing the maximum control force available. It could be said, that with the KC-135 boom having a fixed vertical and horizontal hinge geometry, that the boom yaws right out of control power, i.e., it can not be flown nor driven by the ruddevators to the extremities of the desired envelope.

A more detailed explanation of the manner in which this control system operates is disclosed in U.S. Pat. No. 2,960,295 to Schulze.

Aerodynamic yaw drag increases the lateral aerodynamic control power required from the generally known ruddevator surfaces. However, if the aerodynamic yaw drag of the boom could be reduced at certain lateral linear displacements, the lateral displacement capability of the boom could be increased to provide adequate boom movement and improve the efficiency of aerial refueling.

Previously known efforts have pursued the increase in the aerodynamic lift of the ruddevator surfaces as a method for increasing the control power performance of the refueling boom. However, this approach was found not to be cost effective on the present boom due to the major structural design changes necessary to carry the increased loads. Additional efforts have investigated a change in the pivot axis system which included setting the pivot axis, about which the boom moves laterally, at a fixed angle of inclination other than near vertical. This resulted in a combination of a rolling and yawing action of the boom for a given sideward or lateral displacement angle of the boom, and reduced the aerodynamic yaw drag. Further, by carrying the inclination of this boom lateral motion pivot axis to the extreme, and having it at an essentially horizontal position, almost no lateral or sideward movement of the boom against the freestream occurs. The motion is mostly a rolling action of the boom about its centerline. This type of boom geometry has stability problems and would require considerable development effort before it would be operationally feasible. In addition, the lateral displacement capability of this type boom is much greater at the lower portions of the refueling envelope than at the upper portions. Safety margins are thus compromised in the upper portions of the envelope.

Safety considerations dictate that a continuous aerodynamic control force capability be provided throughout the normal refueling envelope; and that this aerodynamic control force be of sufficient magnitude that the boom can be maneuvered clear of an over-running receiver airplane. Sufficient vertical manueverability must exist to fly the boom at least to the horizon to evade receiver aircraft.

The lateral movement of the boom is equally important to its vertical movement when evading an over-running receiver airplane. Boom operators generally agree, that the necessity for maximum lateral displacement of the boom is greatest when the boom is at the inner upper and inner lower corners of the refueling disconnect envelope; because, the over-runs of the receiver airplane with the boom at the inner lower corner of the refueling envelope, have resulted in boom and receptacle damage, and receiver airplane over-runs with the boom at the inner upper corner of the refueling envelope have resulted in more serious cases of tanker and receiver airplane damage. Maintaining the present known width of the KC-135 boom automatic limits for the refueling disconnect envelope, during all combinations of boom extension and elevation angles, would produce a disconnect envelope with increased safety margins over the current capabilities. The boom gimballing arrangements of the present invention, produces a refueling envelope with increased safety margins. The service history of the tanker airplane refueling operations, indicates that a design disconnect envelope which has an elevation capability of 20° to 40°, is acceptable provided that there is sufficient aerodynamic boom control power available for full utilization of these limits.

SUMMARY OF THE INVENTION

The invention relates to an improvement in the mechanism for attaching an aerial refueling boom to an aircraft such as the Boeing "Stratotanker" KC-135, the Boeing 747, the Boeing 707 or other tanker airplanes, to provide for elevation and azimuth motion of the boom during aerial refueling operation. These airplanes are jet propelled, long range, high altitude, high speed tanker-transport type airplanes, and their primary mission is the refueling of other aircraft in-flight. They are equipped with an aerial refueling system comprising a boom and nozzle, for transferring fuel to a receiver airplane.

The aerial refueling boom is basically a telescoping tube which is attached to the underside of the airplane fuselage by means of a yoke and trunnion mounting arrangement; and provides the means for transferring fuel from the tanker airplane to the receiver airplane while both aircraft are in-flight. Also, on the underside of the tanker airplane is the boom operator who maneuvers the boom into contact with a properly equipped receiver type airplane.

One of the disadvantages of the present known refueling boom geometry, utilizing a fixed vertical azimuth axis and a movable lateral elevation axis, is that as the boom is deflected sideways in yaw, the ruddevators become less effective and the boom drag increases, limiting the controlled travel of the boom and hence its refueling envelope.

The present invention relates to the articulation of the aerial refueling boom with respect to the tanker airplane. The boom elevational axis, or the axis about which the boom rotates when it is moved in a vertical plane relative to the tanker airplane, is fixed structurally with respect to the tanker airplane. The sideward or lateral movement of the boom takes place about an azimuth axis which is inclinable in a vertical plane aligned relative to the tanker airplane longitudinal axis. Although, this aixs is termed the azimuth axis, it will be more clearly understood hereinafter, that as this azimuth axis is inclined from a vertical orientation it will introduce a rolling action of the boom when the boom is moved from side-to-side, in addition to a change in azimuth of the boom.

One of the objects of the present invention is to improve the safety of the in-flight aerial refueling operation between a tanker airplane and a receiver airplane. There have been many occurrences of boom/receptacle or tanker/receiver damage, in addition to the more severe accidents wherein one or more airplanes were destroyed during an aerial refueling operation. The most serious consequences arise from instances where the receiver airplane over-runs the tanker airplane. Therefore, it is important that safety margins be improved by increasing boom maneuvering capability at the inner limit of the refueling envelope.

Another object is to increase the size of the usable refueling envelope in order to permit the larger receiver airplanes such as the B-52 and C-5A, more maneuvering deviations without refueling disconnects. According to experienced opinions, the refueling of present known large receiver airplanes from tanker type airplanes like the KC-135, could be interrupted once by an inadvertent disconnect during a twenty minute refueling transfer.

Another object is to provide a refueling boom that is completely and continuously controllable for the specified speed and altitude range throughout the design disconnect envelope, by improving the effectiveness of the aerodynamic control forces generated by the generally known ruddevator control surfaces, through modifications to the gimballing arrangement of the refueling boom. Currently, refueling disconnects are usually initiated by the boom operator well within the automatic disconnect envelope limits, because of limited boom control power. Further, the aerodynamic control force capability of the ruddevator surfaces should not be compromised, either in the presence of the flow field effects of wide body receiver type airplanes, or at the optimum altitude and airspeed of the receiver airplane for refueling hook-up.

Another object is to ensure adequate boom avoidance clearance from an over-running receiver airplane, by providing for boom elevational angle control above the referenced tanker waterline or horizontal reference plane, and adequate lateral displacement control at this elevational angle.

One of the advantages of the present invention, which utilizes a fixed elevational axis with a tilting or canting azimuth axis, is that this combination of articulation produces a boom rolling action as a function of the change in inclination of the azimuth angle; and the advantage of introducing a roll angle, results in an increase in the effectiveness of the ruddevators and a reduction in boom drag and thereby provides a larger controlled boom refueling envelope.

Another advantage is that the variable inclination of the azimuth axis of the present invention, can be incorporated into the present known boom control system such as the KC-135, which utilizes a ruddevator cable control system with azimuth and elevation pantographing; as well as the advanced fly-by-wire control systems likely to be utilized for some of the newer developments in boom systems.

DESCRIPTION OF THE PREFERRED EMBODIMENTS

Figure 1:
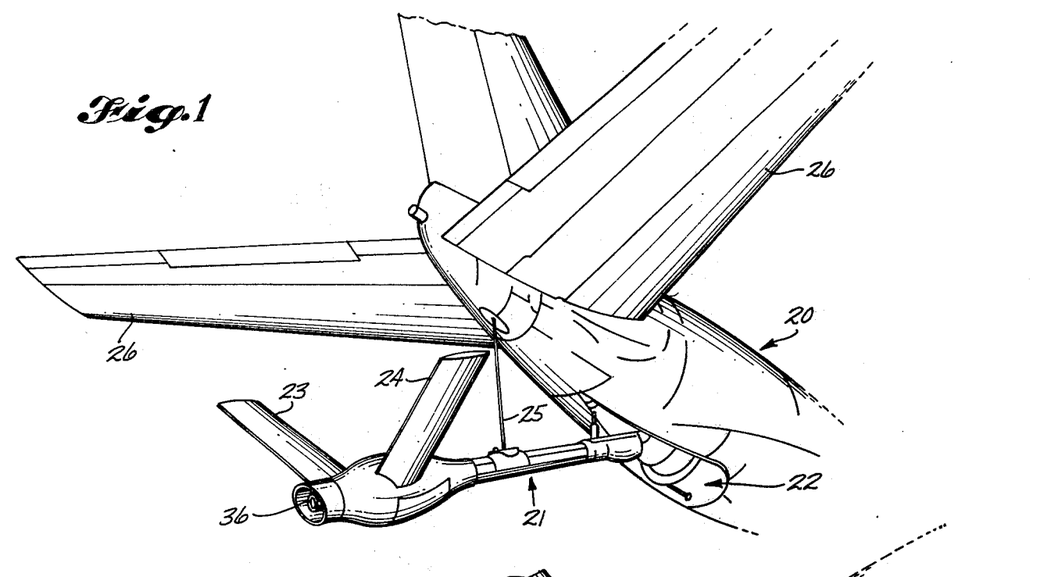
FIG. 1 is a rear perspective view of a tanker airplane showing a refueling boom having V-shaped control surfaces for maneuvering the boom.

FIG. 1 is a rear perspective view of an aerial refueling tanker airplane 20 and shows the ruddevator controlled boom 21 and the operator's compartment 22 located on the underside of the fuselage. The boom operator lies in a prone position when controlling the movement of the boom 21 through a pair of aerodynamic surfaces 23, 24 which are in the form of a Vee and serve as both rudder and elevator control for aerodynamically maneuvering the boom into position and engaging contact with the receiver airplane (not shown). The airstream acting on the ruddevators 23, 24, provides the aerodynamic force for moving the boom 21 in azimuth and elevation.

A hoist cable 25 is attached to the boom 21 at approximately its midpoint for the purpose of pulling the boom up to a stowed position. When the boom is in the stowed position, the geometric dihedral of the ruddevators, 23, 24, permit it to fit against the underside of the fuselage and in the Vee formed by the swept-back horizontal tail surfaces 26 of the tanker airplane 20.

Figure 2:
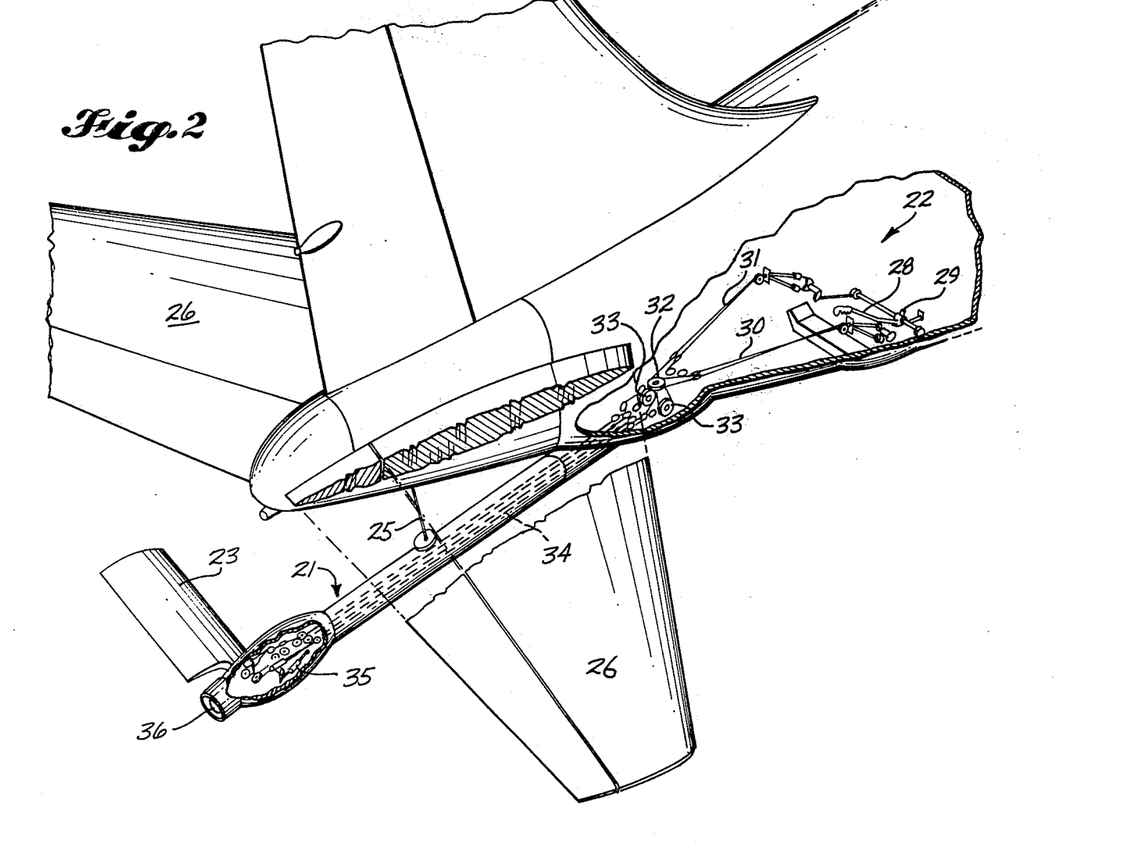
FIG. 2 is a rear perspective view looking down onto the empennage of the tanker airplane shown in FIG. 1 with certain sections being broken away to reveal the details of the boom maneuvering control system.

FIG. 2 is a rear perspective view of the ruddevator control system, looking down onto the empennage of the tanker airplane 20. The boom operator lies in a prone position facing aft, and controls the movement of the boom 21 through an airplane type control stick 28. Movement of the control stick 28 is transmitted through a differential gear box 29 and cable linkage 30, 31 to azimuth and elevation pantographing drums 32, 33 respectively. Through a cable control interconnecton 34 between the pantographing drums 32, 33 and the control valves of hydraulic power units 35 attached to each of the ruddevators 23, 24, the control stick 28 movement is imparted to change the angle-of-attack of the ruddevators 23, 24. Lateral movement of the control stick 28 will cause the ruddevators 23, 24 to rotate in opposite directions and function as an aerodynamic rudder, thereby causing the boom 21 to move in azimuth. Vertical motion of the control stick 28 will cause the ruddevators 23, 24 to rotate in the same direction and function as an aerodynamaic elevator, thereby causing the boom 21 to be raised or lowered.

The elevation pantographing drum 33 and the azimuth pantographing drum 32 are rotatably controlled by the control stick 28 through a cable system 31, 30 that goes around each of the drums. With the control stick 28 held in a fixed position, the drums 33, 32 will be held from rotating; however, when the boom 21 is coupled to a receiver airplane (not shown), and the receiver airplane moves the boom 21, then the pantographing mechanism incorporated between the articulation of the boom and the ruddevators 23, 24, will cause a relative movement of the ruddevators 23, 24 with respect to the boom 21. This pantographing movement of the ruddevators 23, 24 will help alleviate the air loads on the boom 21 that would result from the receiver airplane moving the boom 21 with the control stick 28 being held in a fixed position; i.e., the ruddevators 23, 24 will automatically pantograph without any control input from the boom operator, and function similar to that of a drafting machine.

Telescoping motion of the boom 21 is accomplished through the means of a sprocket drive chain and cable loop system (not shown) which is attached to the telescoping inner structural tube of the boom.

The boom 21 is equipped with a nozzle 36 for automatic attachment to a receptacle installed on the receiver airplane. The nozzle 36 is provided with a ball and a universal joint (not shown), to provide flexibility in the nozzle assembly and permit movement of the boom after the nozzle is secured into the receptacle of the receiver airplane. A spring loaded check valve (not shown) forms the seal in the end of the nozzle when the nozzle is not engaged with the receiver receptacle.

The generally known KC-135 type boom operates about an azimuth axis that is perpendicular to the tanker airplane water lines, and an elevation axis that lies in the plane of the tanker airplane water lines. The elevation axis is perpendicular to the airplane buttock lines when the boom is straight aft, and the elevation axis rotates about the azimuth axis as the boom moves in azimuth.

The desired conditions for the refueling operation is for the tanker airplane to be capable of attaining both the cruise Mach number of the receiver airplane and an altitude close to that for continued cruise of the receiver airplane after the refueling is completed. However, the size of the refueling space envelope of the boom nozzle, is closely dependent upon the speed and altitude of the refueling operation; and an acceptable refueling boom envelope may not be attainable at the optimum conditions required by the potential reciever airplane. The flying boom disconnect envelope, determines the area available for the receiver airplane to maneuver within, during the refueling operation; and anytime that the receiver airplane, after refueling engagement, carries the boom beyond these limits, the boom is disconnected from the receiver airplane by the boom operator. The size of the refueling envelope depends upon the operating length of the boom as well as the angular displacement thereof; e.g., the boom on a Boeing KC-135 type tanker airplane is approximately 27 feet when retracted and approximately 47 feet when extended. Therefore, for this boom size to attain a satisfactorily sized maneuvering envelope, the boom should be capable of attaining the following envelope positions during the in-flight refueling operation: in elevation, from a trail position of 0° in azimuth, a downward elevation displacement of 50°; and with an operating elevation displacement between 20° and 40°, an azimuth displacement of 15° left and 15° right. The air loads on the boom go up very rapidly as the displacement angle i.e., the angle between the longitudinal axis of the tanker airplane and the lengthwise axis of the boom, is increased.

The differential motion of the ruddevator surfaces 23, 24 i.e., the right-hand 24 and left-hand 23 surfaces moving in opposite directions, produces the aerodynamic force moments for rotating the boom about its azimuth axis. The ruddevator control moments for azimuth variation are complicated by the aerodynamic interaction between the airfoil surfaces as they are differentially deflected. It is further complicated by the non-symmetrical flow about the yawed boom and by the collective variation of the ruddevators, to maintain a constant angle of elevation of the boom as it is moved in azimuth. The airflow pattern over the ruddevators, during azimuth variation, is dominated by the influence of the boom fairing and the air loads on the boom which tend to rotate it about its elevation axis. The capability of the ruddevators to pull the boom down against the boom drag load is determined by the combined ruddevator angle i.e., their combined average angle-of-attack relative to their zero angle-of-attack position. Also, as the boom is moved in azimuth, under the influence of the differentially operated ruddevators, the elevation moment forces tend to increase for maintaining the same angle-of-elevation. If the airfoil surfaces are already operating at their maximum combined lifting capacity or past the linear portion of their lift curve, which they would tend to be if the boom were at its maximum elevation angle of say 45° with respect to the tanker centerline, then when the airfoil surfaces were moved differentially to produce moments for rotating the boom in azimuth, the total combined lift in the elevation plane, would be reduced until an equilibrium point is reached. The results of the combined collective and differential angular movement of the airfoil surfaces in moving the boom to various combinations of elevation and azimuth angles, and at certain Mach numbers, determines the plot of the boom control envelope for that Mach number.

Although the present known flying booms, such as on the KC-135 tanker airplane, are faired to give comparatively low drag when operating within their normal in-flight refueling parameters, any appreciable increase in Mach number of the refueling operation, would result in a rise in boom drag; and this higher drag would make it nearly impossible for the ruddevators to aerodynamically force the boom into the desired refueling envelope.

Figures 3, 6:
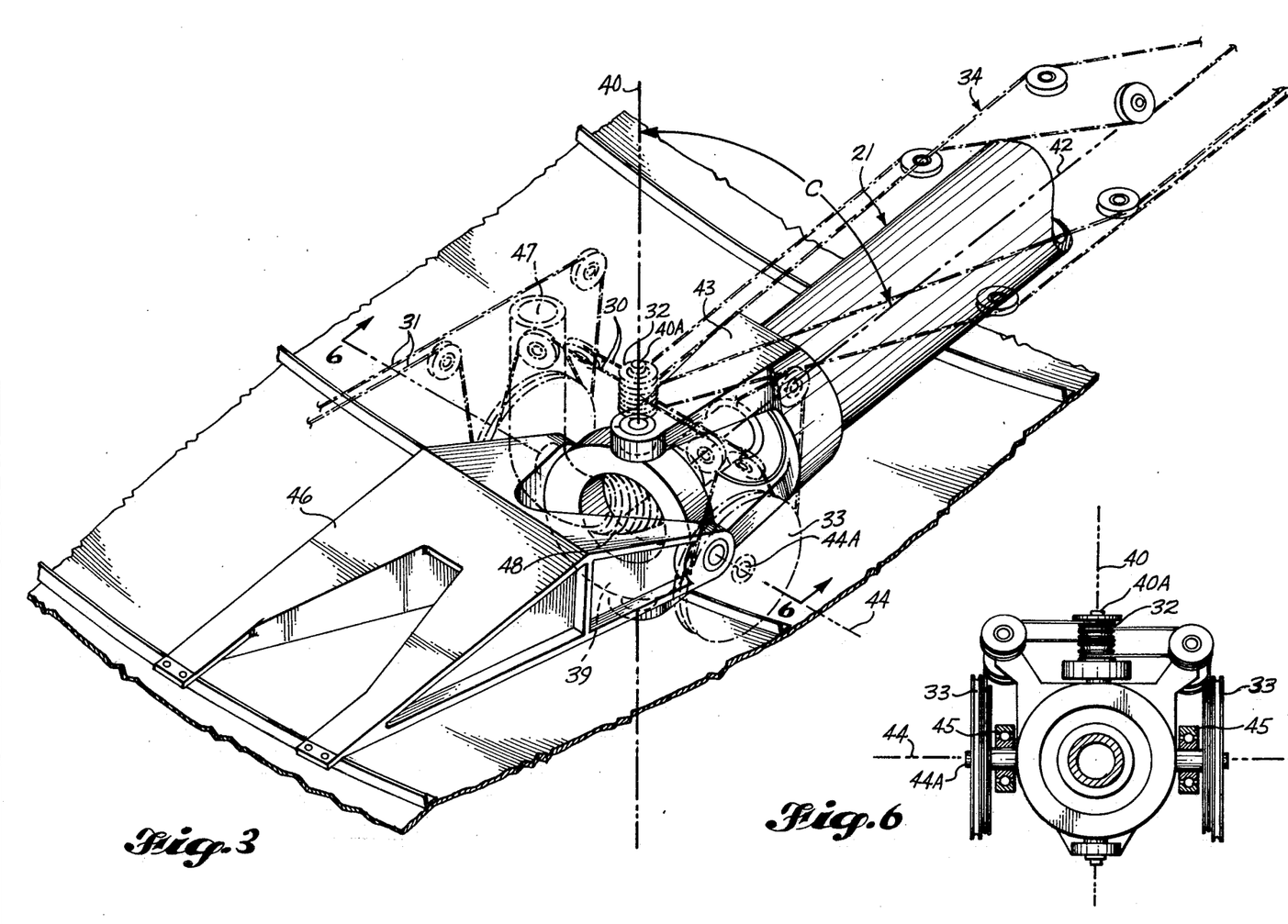
FIG. 3 is an isometric view of the gimballing arrangement of a preferred embodiment of the present invention showing a fixed elevation axis mounted to airplane structure and an inclinable azimuth axis for lateral movement of the boom.
FIG. 6 is a cross-sectional view taken along 6—6 in the direction indicated in FIG. 3.

FIG. 3 is an isometric view of the aerial refueling boom mounting arrangement showing the gimballing details of the first embodiment of the invention, wherein the included angle C between the axis about which the boom moves laterally or the azimuth axis 40 and the centerline 42 of the boom 21, is at a predetermined angle. This angle C may be selected at values other than 90° to optimize envelope shape and size for particular refueling boom geometries.

Figure 4:
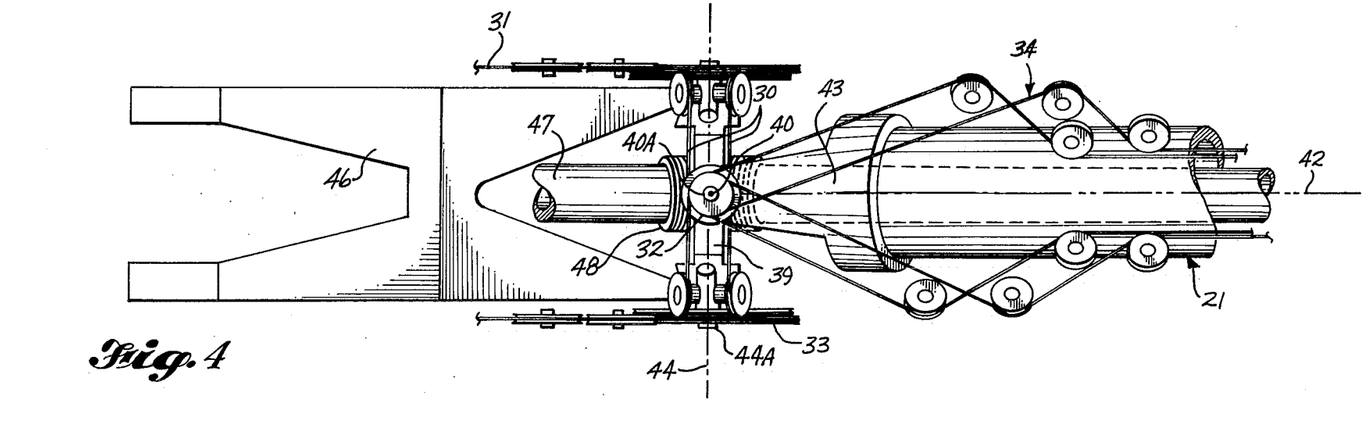
FIG. 4 is a plan view of FIG. 3.
Figure 5:
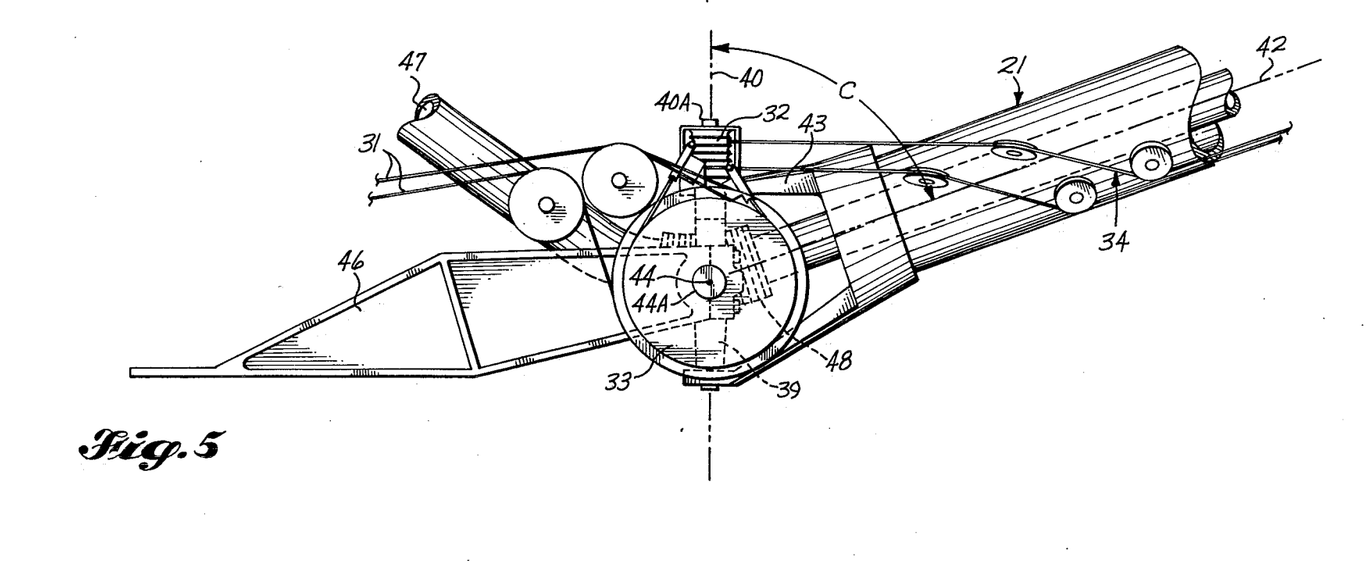
FIG. 5 is a side view of FIG. 3.

FIGS. 4 to 6 are detailed plan, side, and cross-sectional views, respectively, of the boom gimballing shown in FIG. 3; and more clearly depict the gimbal bearing mounting assembly to aircraft support structure.

Referring to FIGS. 3 to 6, the tilting of the azimuth axis 40 about the fixed elevational axis 44, during movement of the boom in elevation, provides the means for incorporating a certain amount of boom roll motion as a function of the change in azimuth angle. The ratio of the angular roll rate vs. the yaw rate or azimuth angle change of the boom, is constantly being varied as the position of the boom changes in elevation. This provides the means for obtaining a relatively large boom control envelope with good boom position stability and control characteristics. To accomplish this, the upper end of the refueling boom 21 has a bifurcated fitting 43 which pivotally mounts the boom, through a yaw spindle or azimuth axle 40A, to a gimbal member 39. The gimbal member 39 has an integral horizontal spindle or elevation axle 44A for mounting, through bearings 45, to an airplane support structural fitting 46, so that the boom and gimbal member 39 are free to rotate about the fixed elevation axis 44. In this manner, the yaw or azimuth axis 40 of the boom 21, is mounted for inclination about the fixed horizontal or elevation axis 44; whereas, in the prior known tanker airplanes, such as the KC-135, the 707, and the 747, the azimuth axis of the boom is fixedly mounted in a vertical position and attached directly to airplane structure.

Rotatably attached to the top of the azimuth axle 40A is the azimuth pantographing drum 32 and control cables 30 are wrapped around the drum for rotatably driving the drum in response to lateral movement of the control stick 28 by the boom operator. This in turn through the cable connection 34 to the ruddevator surfaces 23, 24, shown in FIGS. 1 and 2, produces the aerodynamic control force for rotating the boom 21 about the azimuth axis 40 for sideward movement thereof. Also, for movement of the boom 21 in elevation, a longitudinal movement of the control stick 28 is transmitted by the control cables 31, which are wrapped around the elevation pantographing drums 33, to actuate the ruddevator control surfaces 23, 24. The elevation pantographing drums 33 are rotatably mounted on the elevational axle 44A of the gimbal member 39.

The gimbal member 39 has a central opening through which the fuel line 47 passes; and in the vicinity of the gimbal member 39 the fuel line 47 has a flexible section 48 for permitting relatively free articulation of the boom without restricting the fuel flow therethrough.

When the boom is operating near the upper limit of the automatic refueling disconnect envelope or at the 20° elevational angle, i.e., at an angle measured downwardly from a horizontal reference plane, the azimuth axis 40 of the boom 21 is more vertically orientated than when the boom is operating at the lower limits of the refueling envelope or near the 40° elevation angle. Therefore, when the boom is at the upper limit of the refueling envelope, it can be more adequately maneuvered by the boom operator for clearance avoidance purposes, than when it is at the lower limit of the refueling envelope. At the lower limit of the refueling envelope, the boom azimuth axis 40 or the boom lateral motion pivot axis 40 is inclined towards the horizontal; thereby producing a sufficient boom rolling action with sideward movement thereof, that the yaw drag is significantly reduced and the lateral angular capability of the boom is thereby increased.

The width dimensions, of the refueling disconnect envelope for boom pivotal geometry or different gimballing mechanisms, are determined by the kinematics motion equation $W = 2 \cdot L \cdot \text{sine } (A+B) \cdot \text{sine } Y$: wherein, W is the width of the refueling envelope; L is the length of the boom; A is the angle of inclination of the boom lateral motion axis or azimuth axis above a horizontal reference plane such as an airplane waterline plane; B is the angle of displacement of the boom in elevation below said reference plane; and Y is the boom yaw angle or the angle of lateral displacement of the boom about a lateral motion axis or the angle that the boom moves about an azimuth axis.

Utilizing this equation, it will be noted that for a given maximum lateral displacement angle, the maximum refueling envelope width will occur when the combination of the inclination, of the boom lateral motion axis, above the reference plane and the displacement of the boom in elevation below the reference plane, is equal to ninety degrees, i.e., when the angles A+B or the included angle C is equal to 90°, the sine of this angle is of a maximum value. However, for the boom pivotal arrangement, wherein the boom lateral motion pivot or azimuth axis remains at a fixed vertical orientation, i.e., where the angle A remains at 90°; and the sine (A+B) term decreases as the angle B gets larger with the boom operating at its normal elevational angles of 20° to 40° below the horizontal reference plane. Thus, the lateral angular displacement envelope for the prior known gimballing of the refueling boom, such as the KC-135 tanker airplane, having a fixed vertically orientated azimuth axis, would produce a refueling envelope which is wider at the top or at the 20° elevational position of the boom, than it is at the bottom or at the 40° elevational position.

The effect of the refueling boom pivot axis gimballing arrangement on the parameters of the refueling disconnect envelope shape, for given displacement angles, may be visualized and better understood by an analogy to that of a globe of the earth and by comparison with the latitude and longitude reference system, wherein the distance between two lines of longitude is much greater at the equator than it is towards the polar regions.

A boom with a pivotal geometry similar to that of a Boeing KC-135 type tanker airplane, wherein the boom lateral movement axis or azimuth axis is fixed at an upright vertical position relative to a horizontal reference plane or at an angle A of 90°; will produce a refueling disconnect envelope shape which is wider at the top than at the bottom. This envelope shape is produced when the refueling boom is being operated elevationally at a downwardly inclined angle from a horizontal reference plane of between 20° to 40°. This would be equivalent to 20° to 40° south latitude for the angular displacements in elevation or at an angle B of 20° to 40°, when the boom is being operated laterally 15° on either side of the airplane longitudinal axis which is equivalent to a lateral movement of plus or minus 15° of longitude or an angle Y of 15°.

With the refueling boom of the KC-135 type tanker airplane being downwardly inclined from the horizontal reference plane and operating essentially between 110° to 130° of latitude, the included angle C would be between 110° and 130°. For a given angular displacement of the boom within the upper region of the refueling envelope, the sine (A+B) term increases and results in a larger operating area with greater clearance capability for safety in the event of the receiver airplane over-running the tanker airplane. However, when the boom is operating within the lower region of the refueling envelope, there is a substantial reduction in the area from the standpoint of the receiver airplane and a great deal more maneuvering capability is needed.

The aerodynamic control force created by the ruddevator surfaces coupled with the pivotal geometry of the boom, provides the necessary lateral control for maneuvering the boom within the upper regions of the envelope. However, boom manuevering control power decreases down at the lower elevational limits of the envelope because the boom begins to get into an area where the extreme azimuth position or large yaw angle of the boom produces too much aerodynamic drag for the ruddevator control surfaces to overcome. The increase in boom drag with lateral displacement is a function of the boom characteristics, the boom elevation angle, and the yaw angle with respect to the airstream for a given flight condition. With the lateral axis, inclination angle A fixed at 90°, the motion produced for lateral displacement is essentially aerodynamic yaw. The present KC-135 boom is limited in lateral displacement control power in the lower portions of the refueling envelope. Therefore, the resulting dimensions of the envelope are such that for a like lateral displacement of the boom operator's control stick, the aerodynamic control force produced by the ruddevator surfaces, results in very little sideward movement of the boom at the lower limits of the envelope in comparison to the upper limits.

Furthermore, if the inclination of the azimuth axis is over accentuated, such that angle A approaches zero, it will be apparent that the boom sideward motion ceases and becomes that of a pure rolling action about the boom centerline.

If a boom were constructed such that the lateral motion pivot axis were inclined to a horizontal position or the angle A were fixed at zero degrees, the motion produced for a lateral movement of the boom would be that of a rolling motion. The envelope would be shaped like the area enclosed between 70° and 40° north latitude and plus or minus 15° longitude; assuming the same angular displacements as the previous example wherein angle B is 20° to 40°, and angle Y is 15°. This refueling envelope for the boom would be significantly narrower at the top than at the bottom of the elevation limits, and this condition is not desirable from a safety standpoint.

If a boom were constructed such that the azimuth axis were fixed at an angle A of 10° inclination, as measured up from the horizontal reference plane, and the boom were operated within the normal elevation angles B of from 20° to 40° down from a horizontal reference plane, then the refueling envelope for such pivotal geometry would result in its being narrower at the top than at the bottom. This would be determinable from the aforesaid boom kinematic equation $W = 2 \cdot L \cdot \sine(A+B) \cdot \sine Y$, and the parameters of the resulting refueling envelope may be better understood by again referring to the analogy of the globe of the earth. With this boom operating essentially between 30° to 50° of the north latitude lines, for a given angular displacement of the boom within the lower region of the refueling envelope, the sine (A+B) term increases and results in a larger refueling area; however, when the boom operates in the upper region of the envelope, there is a substantial reduction in the area. The chief detriment of a refueling boom with this pivotal geometry, is that safety wise, the clearance at the top of the envelope is probably the most critical of the refueling parameter; e.g., if the receiver airplane causes the boom to fly into the upper portion of the envelope and there is an automatic refueling disconnect, there would be insufficient sideward control force available to move the boom out of the way of an over-running receiver aircraft.

There is a marked degree of improvement in the lateral capability of the boom when the angle between the boom centerline and the azimuth axis or the axis about which the boom moves sidewardly, is at a 45° included angle as opposed to a 90° angle. The 45° included angle produces a greater degree of boom rolling motion than is produced with the 90° included angle, when the boom is operating at its normal elevational range of 20° to 40°. When the included angle C is greater than 90°, the boom operating geometry and the limits of the refueling envelope, become representative of the present KC-135 tanker boom geometry. Therefore, the boom gimballing arrangements of the embodiments shown in the present invention, are capable of functioning in areas of the refueling envelope which are not attainable by the present known aerial refueling boom geometry and they reduce the aerodynamic drag of the boom when it is operating at the azimuth and elevation extremes of the refueling envelope by inclining the azimuth axis in a longitudinal direction instead of leaving it in the upright or vertically orientated position.

FIGS. 3 to 6 show a gimballing arrangement of this invention wherein the included C or the angle A+B, is fixed and the inclination of the azimuth axis 40 changes as the boom elevation angle changes. This gimballing arrangement results in more boom rolling motion with lateral angular displacemet, at the lower portion of the refueling envelope where angle B is 40°, than at the upper portion of the refueling envelope where angle B is 20°.

The aerodynamic drag characteristics of a KC-135 type boom, due to yaw or lateral angular displacement, is more limiting to the width of the refueling envelope at the elevation angle B of 40°; and any width improvements at the lower elevation portions of the refueling envelope should be made without penalizing the maneuvering capability of the boom in the upper portions of the refueling envelope, as might occur if the boom had a fixed inclination azimuth axis which was optimized for boom operation in the lower portion of the refueling envelope.

A refueling envelope width that remains approximately constant throughout the boom elevation angles B of 0° to 40°, may be realized by the proper selection of the included angle A+B for the particular characteristics of a given boom.

In general, having the azimuth axis substantially inclined towards the horizontal, is advantageous when the boom is being operated at the lower limit of the refueling envelope; however, when the boom is being operated at the upper limit of the envelope, having the azimuth axis remain so inclined is detrimental. Therefore, as taught by the present invention, there is a significant advantage in varying the angle of inclination of the azimuth axis as the boom is moved between the upper and the lower portions of the envelope.

Figures 7, 8:
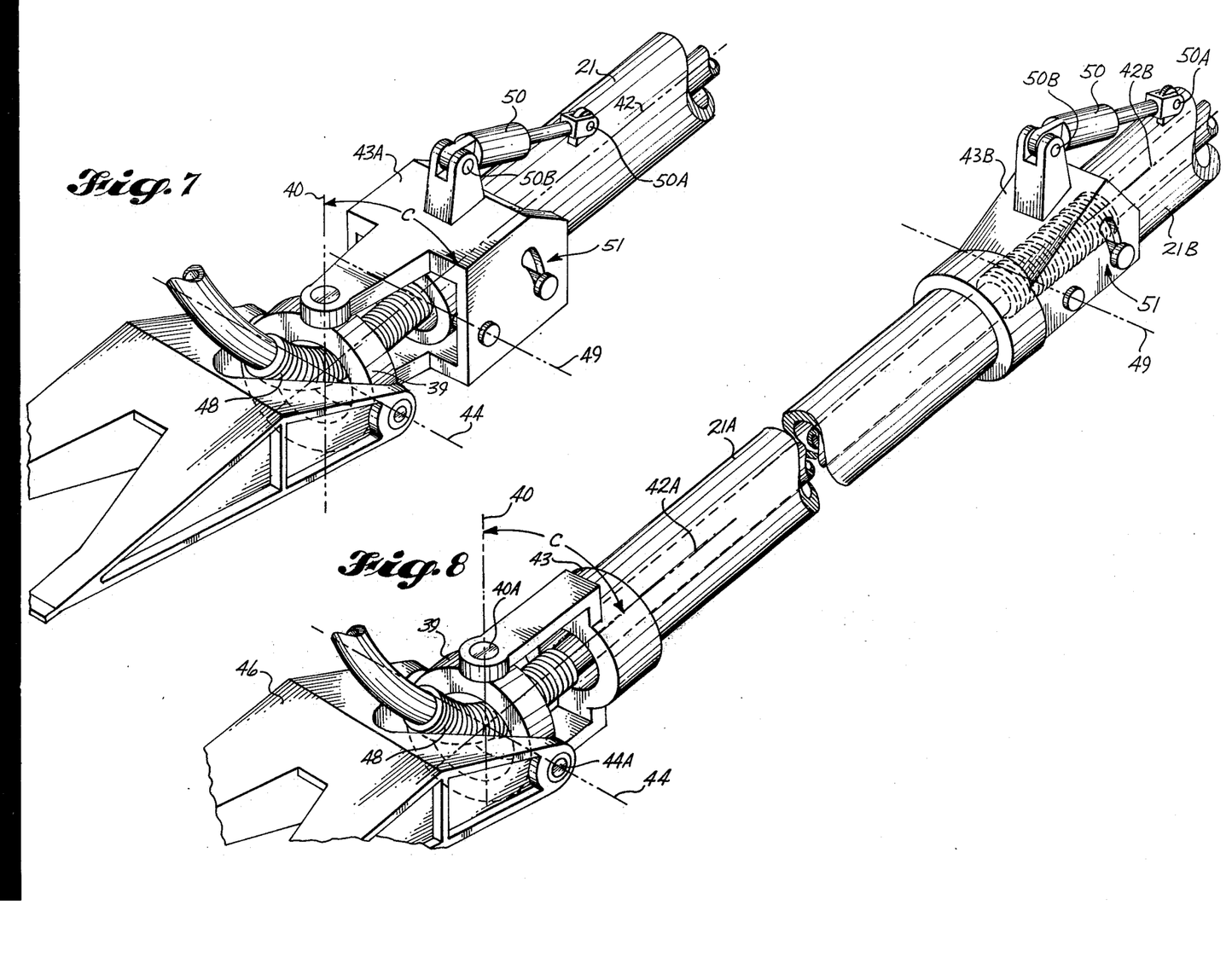
FIG. 7 is an isometric view of a second embodiment of the invention having actuating means for varying the included angle between the azimuth axis and the centerline of the boom.
FIG. 8 is an isometric view of a third embodiment of the invention wherein the boom articulation provides a dual section type of boom.

FIG. 7 is an isometric view of a second embodiment of the invention and shows an aerial refueling boom mounting arrangement somewhat similar to that shown in FIGS. 3 to 6, with the exception that the included angle C between the lateral motion or azimuth axis 40 and the boom centerline 42 is variable. Those elements which are similar to those previously described have been given like reference numerals and where there are some differences in the elements, they have been identified with different numerals or a letter suffix has been added. The capability to vary this included angle C permits the selection of a greater boom rolling action and hence lower drag for lateral movement at the lower portions of the envelope while retaining an acceptable boom rolling motion in the upper portions of the envelope, than would be possible with a fixed included angle.

The boom mounting arrangement embodies a first elevation axis 44 which intersects the boom lateral motion pivot axis or azimuth axis 40, and a second elevation axis 49 which is off-set from said first axis. Through this arrangement, the included angle C, which is between the azimuth axis 40 and the longitudinal centerline 42 of the boom, can be varied by an actuator 50 which is interconnected between the boom 21 at one end 50A and the bifurcated fitting 43A of the boom at the other end 50B. The actuator 50 provides the means for rotating the boom 21 about the second elevation axis 49, thereby varying the included angle C; and the slotted stop means 51 limits the degree of angular change. By varying the included angle C while the tanker airplane is in flight, permits the boom operator to modify the refueling disconnect envelope so as to more readily adapt it to the different operating parameters required by the various types of receiver aircraft or as the operating conditions dictate.

With a 90° included angle C setting and with the boom centerline 42 set at an elevational angle of 20° as measured down from the horizontal reference plane, which is normally the elevation angle set as the upper limit of the boom disconnect envelope, the lateral pivot axis 40 of the boom will then be at the position of 70° up from the horizontal reference plane or inclined from the vertical by an angle of 20°; thereby, producing a small degree of boom roll motion with boom movement in a lateral direction. With the boom operating at this 20° elevational position of the refueling envelope, where a great deal of boom clearance maneuvering capability is necessary, there is very little boom rolling action introduced jointly with sideward movement; because, boom rolling action is what produces the aerodynamic change to the ruddevator surfaces with the change in azimuth of the boom. The ratio of boom rolling action v.s. its change in azimuth, as the angle of inclination of the boom lateral motion pivot axis is varied, may be more clearly understood by analyzing the kinematic motion of the boom from two possible extremes in the position of the boom's azimuth axis and assuming that the boom is to be operated while remaining in the zero elevation position or parallel to the horizontal reference plane in both of the following two position extremes of the azimuth axis, i.e.: first, where the azimuth axis is vertically aligned with respect to the horizontal reference plane, the boom would only be kinematically capable of a yaw movement about the vertically aligned azimuth pivot axis for producing a change in azimuth angle and no rolling action; and second, where the azimuth axis is in a parallel alignment with the horizontal reference plane, the boom would only be kinematically capable of a rolling motion with no change in azimuth angle, i.e., the boom would in essence be pivoting about an axis in alignment with its centerline; and the degree of lateral movement of the boom, between these two extremes, can be determined by the aforesaid boom kinematic equation, $W = 2 \cdot L \cdot \sine (A+B) \cdot \sine Y$.

Referring to FIG. 7, with the included angle C fixed at 90° and with the boom 21 operating at a 20° elevational position, the angle of inclination of the azimuth axis 40 would be at 70° up from a horizontal reference plane and there would be some boom rolling action with lateral movement. This could create some potential stability problems, but there is still a great deal of lateral boom control capability available at the 20° elevation, if needed for safety clearance purposes.

However, with the boom 21 at a 40° elevational position, where the angle of inclination of the azimuth axis 40 is now at 50° up from a horizontal reference plane, now the amount of roll motion that results from a given lateral movement of the boom is significant in comparison to the boom operation at the 20° elevational position. This increase in boom rolling action serves to significantly reduce the yaw angle of the boom with sideward movement.

At the different angles A of inclination of the azimuth axis of 30°, 45° and 60° up from the horizontal plane, there is a change in relationship between the physical angle of the boom in sideward movement v.s. the true aerodynamic yaw angle of the boom.

As a first example, where the azimuth axis is inclined to an angle A of 60° and the boom is lowered to an elevational angle B of 30°, then with the boom moved sidewardly to an azimuth angle of 15°, which is the extreme azimuth angle position for automatic disconnect of the refueling boom for the KC-135 type tanker airplane, the aerodynamic yaw angle is reduced by a significant 4°.

As a second example, where the azimuth axis is inclined to an angle A of 45° and the boom is lowered to an elevational angle of 45°, which is normally beneath the lower automatic disconnect envelope but is an elevational angle that the boom could be aerodyanmically flown to for most conditions, then with the boom moved sidewards to an azimuth angle of 15°, there would only be a true aerodynamic yaw angle of 7°.

As a third example, where the azimuth axis is inclined to an angle A of 10° and the boom is operated at its normal elevational angles of between 20° to 40° within the envelope, then for a given azimuth angular displacement, the aerodynamic yaw angle for the boom would be reduced even more. However, as the inclination of the azimuth axis approaches an angle parallel to the horizontal reference plane, there is that potential for the boom to lose its stability control.

With respect to the embodiment shown in FIG. 7, when the included angle C remains fixed at 90°, then the inclination of the azimuth axis 40 with a change in boom elevation within the normal envelope of 20° to 40°, produces some desirable characteristics in that the variation in the inclination of the azimuth axis produces a more nearly straight sided envelope. Also, as the boom is moved towards the lower elevations of the envelope, having the azimuth axis also incline towards the horizontal, has some advantages when the boom is being operated in the lower portion of the envelope.

However, if the azimuth axis were to remain fixed at an inclination angle A of 50° where it was at when the boom was operating at the lower elevation of the envelope around 40° and the boom were then raised to the upper portion of the envelope around 20°, then if it became necessary to maneuver the boom rapidly out of the way of an over-taking receiver airplane it may be found that there is insufficient control force available. This would be due to the included angle C now being substantially less than the angle of 90° which produces the maximum boom control capability.

In general, having the azimuth axis inclined towards the horizontal, is advantageous when the boom is being operated at the lower limit of the refueling envelope; however, when the boom is being operated at the upper limit of the envelope, having the azimuth axis remain inclined near the horizontal, is detrimental. Therefore, as taught by the present invention, there is a significant advantage in varying the angle of inclination of the azimuth axis as the boom is moved between the upper and the lower portions of the envelope.

While an included angle of 90° between the azimuth axis and the boom centerline may provide the maximum in the geometrical relationship that has herein been discussed, it does not necessarily provide the optimum characteristics, when comparing some of the other aerodynamic benefits that may also be derived.

FIG. 8 is an isometric view of a third embodiment of the invention and shows an aerial refueling boom mounting arrangement wherein two elevational axes are substantially separated from one another along the length of the boom; thereby, providing in essence, a dual sectional or articulating arm type of boom arrangement.

Those elements which are similar to those previously described have been given like reference numerals and where there are some differences in the elements, they have been identified with different numerals or a letter suffix added.

The upper first section 21A of the dual section boom is articulated to aircraft support structure 46 in a manner somewhat similar to the first embodiment shown in FIGS. 3–6; and the lower second section 21B of the dual section boom is articulated to the upper first section 21A through an actuatably adjustable elevation hinging arrangement which is somewhat similar to that of the second embodiment shown in FIG. 7.

The tilting of the azimuth axis 40 about the fixed elevation axis 44, during movement of the boom upper first section 21A in elevation, provides the means for incorporating a certain amount of boom rolling action as a function of the change in azimuth angle. The ratio of angular roll v.s. the yaw rate or azimuth angle change of the dual section boom, can be varied as the upper first section 21A is moved about the elevation axis 44.

During refueling engagement with a receiver aircraft, the lower second section 21B of the dual boom would generally be operated, through utilization of the actuator 50, at a lesser angle-of-attack relative to the airstream, than the upper first section; and the advantage of this would be that the ruddevator surfaces would be required to produce less aerodynamic control forces to counteract boom drag when it is being flown at the lower limits of the refueling disconnect envelope. Although the upper first section 21A of the dual boom would project into the airstream at a much higher angle-of-attack or greater angle of elevation (as measured down from the horizontal reference plane) than that of a one piece boom of the same overall length, and also have a higher local Mach number, it does not have much of a moment arm length in comparison to the overall length of the dual section boom; and moment arm length is one of the major contributing factors in determining the amount of aerodynamic control forces required by the ruddevator surfaces. The angle of sweep of the lower second section 21B of the dual section boom, is greater than either the upper first section 21A or a one piece boom of equivalent overall length; therefore, the effective aerodynamic drag of this section is decreased because the normal Mach number is lower. To accomplish this, the upper end of the first section 21A has a bifurcated fitting 43 which connects through a yaw spindle or azimuth axle 40A, to a gimbal member 39. The gimbal member 39 has an integral horizontal spindle or elevation axle 44A for mounting, through bearings 45 to the airplane support structural fitting 46, so that the first boom section 21A and the gimbal member 39 are free to rotate about the fixed elevation axis 44. The lower second section 21B of the dual section boom, is connected to the lower end of the first section 21A through a fitting 43B which embodies a second elevation axis 49. An actuator 50 interconnects at one end the second section 21B at 50A, and at the other end 50B to the fitting 43B. Through this arrangement, the angular relationship in elevation between the two sections of the dual boom, can be varied to permit the boom operator to modify the refueling disconnect envelope as desired. By proper selection of the angular relationship between the boom sections and the inclination of the azimuth axis 40, the amount of boom rolling motion with a lateral angular displacement of the boom, can be adjusted without penalizing the maneuvering capability of the boom during its operation between the upper and lower limits of the refueling disconnect envelope. Alternatively, with respect to FIG. 8, the upper first section 21A of the dual section boom could be articulated to aircraft support structure 46 in a manner similar to the embodiment shown in FIG. 7, for providing the means for varying the included angle C between the motion or azimuth axis 40 and the boom centerline 42A of the upper first section 21A of the dual section boom.

Figure 9:
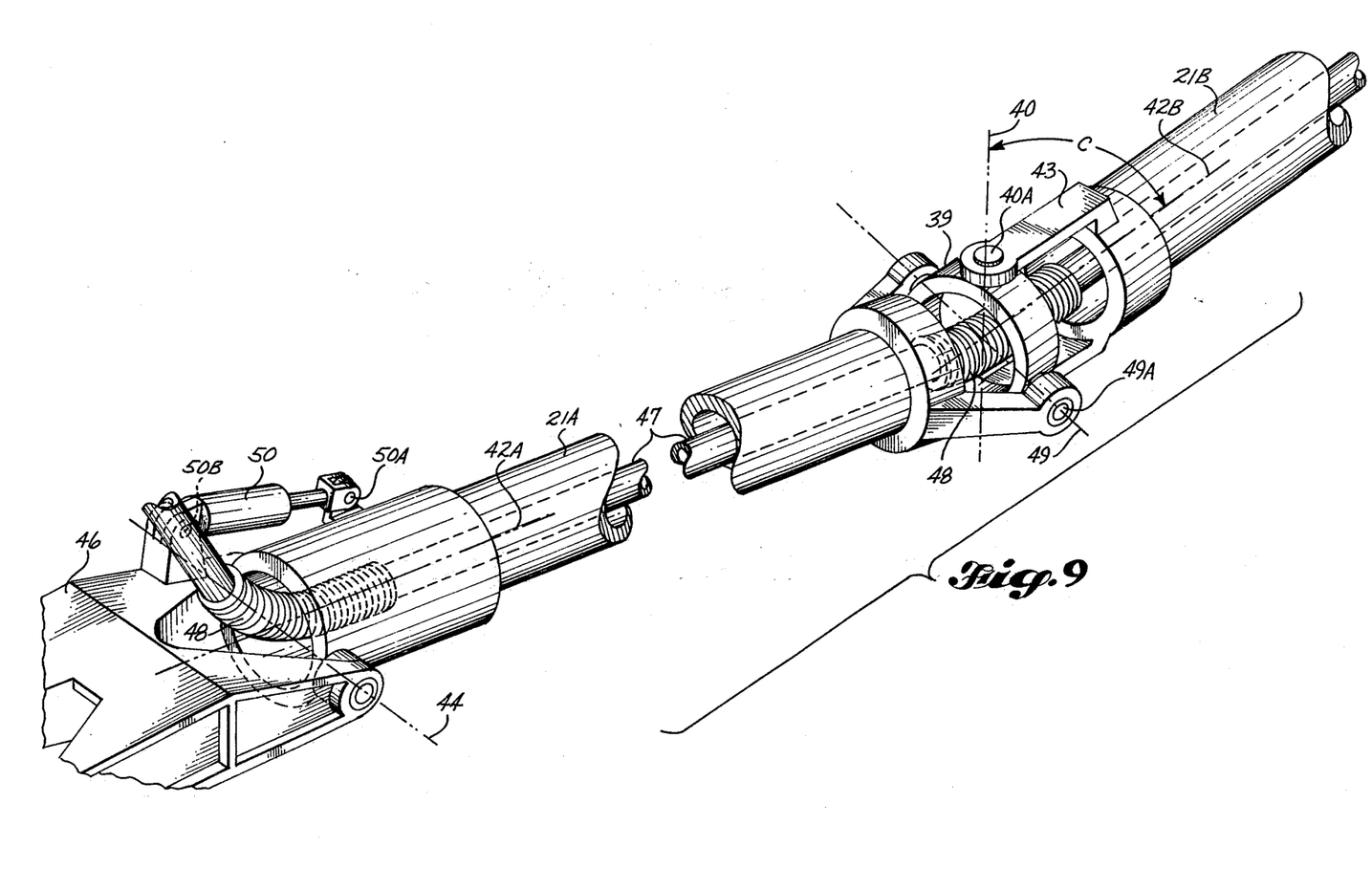
FIG. 9 is an isometric view of a fourth embodiment of the invention showing a dual section boom arrangement somewhat similar to FIG. 8 except that the articulation of the boom section is somewhat reversed.

FIG. 9 is an isometric view of a fourth embodiment of the invention and shows a dual section aerial refueling boom mounting arrangement, wherein: the upper first section 21A of the dual section boom is connected to aircraft support structure 46, through an actuatably adjustable elevation hinging arrangement; and the lower second section 21B of the dual section boom is articulated to said first section 21A through a gimballing arrangement. This gimballing results in the inclination of an azimuth axis 40 as the second section of the boom is moved in elevation about the axis 49.

Those elements which are similar to those previously described have been given like reference numerals and where there are some differences in the elements, they have been identified with different numerals or a letter suffix has been added.

Referring to FIG. 9, the first section 21A of the dual section boom is connected to an airplane support structural mounting 46 for rotation about a fixed first elevation axis 44. An actuator 50 is connected at one end to the first boom section 21A and at the other end to the support mounting 46 for interaction therebetween to project the first boom section 21A into the airstream.

The upper end of the second boom section 21B has a bifurcated fitting 43 which is pivotally connected through a yaw spindle or azimuth axle 40A, to the gimbal member 39. The gimbal member 39 has an integral transverse spindle or second elevation axle 49A for connection to the lower end of the first boom section 21A, so that the second boom section and gimbal member 39 are free to rotate about the second elevation axis 49. The gimbal member 39 has a central opening through which a fuel line 47 passes and in the vicinity of the gimbal member 39 the fuel line 47 has a flexible section 48 for permitting a relatively free articulation of the second section of the boom without restricting fuel flow therethrough. The included angle C between the axis about which the second section 21B rotates laterally of the azimuth axis 40 and the centerline 42B of the second boom section 21B, is set at a predetermined angle which may be other than 90° to optimize the refueling disconnect envelope size and shape to suit certain refueling parameters. Tilting of the azimuth axis 40 from a vertically aligned orientation, about the second elevation axis 49, during movement of the second boom section 21B in elevation, provides the geometric means for incorporating a certain amount of boom roll motion as a function of the change in azimuth angle. As the elevational position of the second boom section 21B is varied, the ratio of the angular roll rate v.s. the yaw rate or azimuth angle change of the second boom section 21B, is changed. This gimballing arrangement results in a greater amount of boom rolling motion with lateral angular displacement of the boom as the angle of inclination of the azimuth axis 40 is increased from that of a vertical orientation.

This fourth embodiment of the invention, offers the advantages of a dual section boom arrangement in reducing boom elevation moments due to drag. It also provides unique articulating motion which might be more readily adaptable to situations where space is more limited than would be the embodiment shown in FIG. 8. Further, the lateral motion of the refueling receptacle at the end of the dual boom, due to the unique articulation, is also somewhat different from that of the other embodiments; and this may be desirable for particular applications.

What is claimed is:

1. Apparatus for attaching a boom to a supply airplane for the aerial transfer of material to a receiver airplane, comprising: a gimbal member mounted to support structure of the supply airplane for rotation about a transverse horizontal axis approximately parallel to the lateral axis of the supply airplane; said gimbal member connectably supporting the boom for lateral movement relative to the supply airplane about an azimuth axis, said azimuth axis being fixed at a predetermined angle less than 90° to the lengthwise axis of the boom; said boom gimballing arrangement providing a geometrical disconnect envelope from said receiver airplane as determined by $W=2 \cdot L \cdot \text{sine}(A+B) \cdot \text{sine } Y$, wherein W is the geometrical width of said disconnect envelope, L is the length of said boom, A is the angle of inclination of said boom azimuth axis above a horizontal reference plane, B is the angle of elevation of said boom below said horizontal reference plane, and Y is the yaw angle of the boom about said azimuth axis; and means for moving the boom in elevation and canting the azimuth axis towards the horizontal from a vertical orientation with respect to the supply airplane to provide a boom rolling motion coupled with sideward movement thereof.

2. Apparatus for transferring material from a supply airplane to a receiver airplane, comprising: a tube for transferring material therethrough from the supply airplane to the receiver airplane; a nozzle connected to one end of the tube for attachment to the receiver airplane; articulation means for supportably connecting the other end of the tube to the supply airplane said articulation means comprising a gimbal member mounted to support structure of the supply airplane for rotation about a transverse horizontal axis approximately parallel to the lateral axis of the supply airplane; said gimbal member connectably supporting the tube for lateral movement relative to the supply airplane about an azimuth axis, said azimuth axis being fixed at a predetermined angle less than 90° to the lengthwise axis of the tube; said tube articulation means providing a geometrical disconnect envelope from said receiver airplane as determined by $W=2 \cdot L \cdot \text{sine}(A+B) \cdot \text{sine } Y$, wherein W is the geometrical width of said disconnect envelope, L is the length of said tube, A is the angle of inclination of said tube azimuth axis above a horizontal reference plane, B is the angle of elevation of said tube below said horizontal reference plane, and Y is the yaw angle of said tube about said azimuth axis; and means for moving the tube in elevation and thereby canting the azimuth axis so as to provide a tube rolling motion coupled with sideward movement thereof.

3. Apparatus for attaching an aerial refueling boom to a tanker airplane, comprising: a gimbal member mounted to support structure of the tanker airplane for rotation about a fixed elevation axis approximately parallel to the lateral axis of the tanker airplane; said gimbal member connectably supporting the refueling boom for movement about an axis of azimuth relative to the tanker airplane, said axis of azimuth being fixed at a predetermined angle less than 90° to the lengthwise axis of the refueling boom; said boom gimballing arrangement providing a geometrical refueling disconnect envelope from said receiver airplane as determined by $W=2 \cdot L \cdot \text{sine}(A+B) \cdot \text{sine } Y$, wherein W is the geometrical width of said refueling disconnect envelope, L is the length of said boom, A is the angle of inclination of said boom azimuth axis above a horizontal reference plane, B is the angle of elevation of said boom below said horizontal reference plane, and Y is the yaw angle of the boom about said azimuth axis; and means for moving the boom in elevation and canting the azimuth axis from a vertical orientation parallel to the yaw axis of the tanker airplane to provide a boom rolling motion with sideward movement thereof.

4. Apparatus for attaching an aerial refueling boom to a tanker airplane, comprising: aircraft structure connectably supporting the refueling boom for movement in a vertical plane about a fixed elevation axis; said aircraft structure including means connectably supporting the refueling boom for movement about an azimuth axis to permit sideward movement of the boom relative to the tanker airplane, said azimuth axis being at a predetermined angle less than 90° to the lengthwise axis of the boom; said boom connectable support means providing a geometrical refueling disconnect envelope determined by $W=2 \cdot L \cdot \text{sine}(A+B) \cdot \text{sine } Y$, wherein W is the geometrical width of said refueling disconnect envelope, L is the length of said boom, A is the angle of inclination of said boom azimuth axis above a horizontal reference plane, B is the angle of elevation of said boom below said horizontal reference plane, and Y is the yaw angle of the boom about said azimuth axis; and means for moving the boom in elevation and rotatably inclining the azimuth axis in a vertical longitudinal plane about said fixed elevation axis from a vertical orientation parallel to the yaw axis of the tanker airplane to provide a combined boom rolling action with sideward movement thereof.

5. Apparatus for attaching an aerial refueling boom to a tanker airplane, comprising: aircraft structure including connectable support means for pivotally mounting the aerial refueling boom for rotational movement about two axes comprising, a fixed horizontal axis for movement of the boom in elevation and an inclinable azimuth axis for movement of the boom laterally relative to the tanker airplane; said azimuth axis being fixed relative to the boom at a predetermined angle less than 90° to the lengthwise axis of the boom; said boom connectable support means providing a geometrical refueling disconnect envelope determined by $W=2 \cdot L \cdot \text{sine}(A+B) \cdot \text{sine } Y$, wherein W is the geometrical width of said refueling disconnect envelope, L is the length of said boom, A is the angle of inclination of said boom azimuth axis above a horizontal reference plane, B is the angle of elevation of said boom below said horizontal reference plane, and Y is the yaw angle of the boom about said azimuth axis; means for moving the boom in elevation about the fixed horizontal axis and inclining the azimuth axis from a vertical orientation relative to the yaw axis of the tanker airplane for producing a change in the ratio of a boom rolling motion versus lateral movement thereof.

6. Apparatus for transferring material from a supply airplane to a receiver airplane, comprising: a tube for transferring material therethrough from the supply airplane to the receiver airplane; a nozzle connected to one end of the tube for attachment to the receiver airplane; articulation means for supportably connecting the other end of the tube to the supply airplane for rotational movement about two axes comprising, a fixed horizontal axis for movement of the tube in elevation and an azimuth axis for movement of the tube laterally relative to the supply airplane; said azimuth axis being at an angle less than 90° to the lengthwise axis of the tube; said tube articulation means providing a geometrical disconnect envelope from said receiver airplane as determined by $W=2 \cdot L \cdot \text{sine}(A+B) \cdot \text{sine } Y$, wherein W is the geometrical width of said disconnect envelope, L is the length of said tube, A is the angle of inclination of said tube azimuth axis above a horizontal reference plane, B is the angle of elevation of said tube below said horizontal reference plane, and Y is the yaw angle of said tube about said azimuth axis; and means for moving the tube in elevation about the fixed horizontal axis and inclining the azimuth axis to produce a change in the ratio of a tube rolling motion versus lateral movement thereof.

7. Apparatus for attaching an aerial refueling boom to a tanker airplane, comprising: aircraft structure including boom connectable support means mounting the aerial refueling boom for rotational movement about two axes comprising, a fixed horizontal axis for movement of the boom in elevation and an azimuth axis for movement of the boom laterally relative to the tanker airplane; said azimuth axis forming an included angle with the lengthwise axis of the boom; said boom connectable support means providing a geometrical refueling disconnect envelope determined by $W=2 \cdot L \cdot \text{sine}(A+B) \cdot \text{sine } Y$, wherein W is the geometrical width of said refueling disconnect envelope, L is the length of said boom, A is the angle of inclination of said boom azimuth axis above a horizontal reference plane, B is the angle of elevation of said boom below said horizontal reference plane, and Y is the yaw angle of the boom about said azimuth axis; means for moving the boom in elevation and rotating both the azimuth axis and the included angle, about the fixed horizontal axis, to produce a change in the ratio of boom rolling motion versus boom lateral motion; and means for varying the included angle formed between the azimuth axis and the lengthwise axis of the boom to less than 90° to also produce a change in said ratio of boom roll versus lateral motion.

8. Apparatus for transferring material from a supply airplane to a receiver airplane, comprising; a tube for transferring material therethrough from the supply airplane to the receiver airplane; a nozzle connected to one end of the tube for attachment to the receiver airplane; tube connectable support means mounted to structure of the supply airplane for providing rotational movement of the tube about two axes comprising, a fixed horizontal axis for movement of the tube in elevation and an azimuth axis for movement of the tube laterally relative to the supply airplane; said azimuth axis forming an included angle with the lengthwise axis of the tube; said tube connectable support means providing a geometrical disconnect envelope from said receiver airplane as determined by $W=2 \cdot L \cdot \text{sine}(A+B) \cdot \text{sine } Y$, wherein W is the geometrical width of said disconnect envelope, L is the length of said tube, A is the angle of inclination of said tube azimuth axis above a horizontal reference plane, B is the angle of elevation of said tube below said horizontal reference plane, and Y is the yaw angle of said tube about said azimuth axis; means for moving the tube in elevation and thereby rotating the azimuth axis and the included angle about the fixed horizontal axis and producing a change in the ratio of tube rolling motion versus boom lateral motion; and means for varying the degrees of the included angle formed between the azimuth axis and the lengthwise axis of the tube to less than 90° for producing an additional change to said ratio of tube roll versus lateral motion.

9. Aerial refueling boom articulation to a tanker airplane, comprising: a dual sectional aerial refueling boom comprising an upper first section and a lower second section; the upper first section being articulated to support structure of the tanker airplane for movement about axes comprising, a fixed horizontal axis for movement of the first boom section about a first elevation axis, and an azimuth axis for movement of the first boom section laterally relative to the tanker airplane; said azimuth axis being fixed at a predetermined angle less than 90° to the lengthwise axis of the first boom section; the lower second section of the boom being articulated to the upper first section for movement about a second elevation axis; means for actuating the lower second section of the boom to vary its angular alignment with the upper first section and alter the angle of sweep between the dual boom sections; and means for aerodynamically moving the dual sectional boom in elevation and rotating the azimuth axis about the first elevation axis to produce a change in the ratio of boom rolling motion versus boom lateral motion.

10. Apparatus for attaching a dual sectional boom to a supply airplane, comprising: a gimbal member mounted to support structure of the supply airplane for rotation about a fixed first elevation axis approximately parallel to the lateral axis of the supply airplane; said gimbal member connectably supporting an upper first section of the dual sectional boom for movement about an axis of azimuth relative to the supply airplane, said axis of azimuth being fixed at a predetermined angle less than 90° to the lengthwise axis of the first boom section; a lower second section of the dual boom being pivotally connected to the upper first section for movement about a second elevation axis; actuating means for rotatably pivoting the lower section of the boom about the second elevation axis, to change its angular alignment with the upper first section and thereby vary the angle of sweep between the dual boom sections; and airfoil means for aerodynamically maneuvering the dual sectional boom in elevation and thereby rotating the azimuth axis about the first elevation axis and producing a change in the ratio of boom rolling motion versus boom lateral motion.

11. Aerial refueling boom articulation to a tanker airplane, comprising: a dual sectional aerial refueling boom comprising an upper first section and a lower second section; the upper first section being articulated to support structure of the tanker airplane for movement about axes comprising, a fixed horizontal axis for movement of the first boom section about a first elevation axis, and an azimuth axis for movement of the first boom section laterally relative to the tanker airplane; said azimuth axis forming an included angle with the lengthwise axis of the first boom section; the lower second section of the boom being articulated to the upper first section for movement about a second elevation axis; means for actuating the lower second section of the boom to vary its angular alignment with the upper first section and alter the angle of sweep between the dual boom sections; means for aerodynamically moving the dual sectional boom in elevation and thereby rotating the azimuth axis about the first elevation axis and producing a change in the ratio of boom rolling motion versus boom lateral motion; and means for varying the degrees of the included angle formed between the azimuth axis and the lengthwise axis of the boom to less than 90° to also produce a change to said ratio of boom roll versus lateral motion.

12. Apparatus for articulating a dual sectional boom to a supply airplane, comprising: a gimbal member mounted to support structure of the supply airplane for rotation about a fixed first elevation axis approximately parallel to the lateral axis of the supply airplane; said gimbal member connectably supporting an upper first section of the dual sectional boom for movement about an axis of azimuth relative to the supply airplane, said axis of azimuth forming an included angle with the lengthwise axis of the first boom section; a lower second section of the dual boom being pivotally connected to the upper first section for movement about a second elevation axis; actuating means for rotatably pivoting the lower section of the boom about the second elevation axis, to change its angular alignment with the upper first section and thereby vary the angle of sweep between the dual boom sections; airfoil means for aerodynamically maneuvering the dual sectional boom in elevation and thereby rotating the azimuth axis about the first elevation axis and producing a change in the ratio of boom rolling motion versus boom lateral motion; and means for varying the included angle formed between the azimuth axis and the lengthwise axis of the boom to less than 90° for also producing a change to said ratio of boom coil versus lateral motion independently of that produced by the inclination of the azimuth axis by the airfoil means.

13. Aerial refueling boom articulation to a tanker airplane, comprising: a dual sectional aerial refueling boom comprising an upper first section and a lower second section; the upper first section being articulated to support structure of the tanker airplane for movement about axes comprising, a fixed horizontal axis for movement of the first boom section about a first elevation axis, and an azimuth axis for movement of the first boom section laterally relative to the tanker airplane; said azimuth axis forming an included angle with the lengthwise axis of the first boom section; the lower second section of the boom being articulated to the upper first section for movement about a second elevation axis approximately parallel to the first elevation axis when the dual sectional boom is in a vertical plane alignment with the longitudinal axis of the tanker airplane; said second elevation axis being substantially separated lengthwise along the overall length of the boom from the first elevation axis and providing the interconnection forming the dual sectional boom arrangement; means for moving the lower second section of the boom about the second elevation axis to vary the angular alignment between the dual boom sections and change the angle of sweep between the dual boom sections, such that the upper first section projects into the airstream at a much greater angle of elevation, as measured down from a horizontal reference plane, than the lower second section; aerodynamic control surfaces connected to the lower second section of the boom for moving the dual sectional boom in elevation and rotating the azimuth axis about the first elevation axis to produce a change in the ratio of boom rolling motion versus boom lateral motion; and means for varying the included angle formed between the aximuth axis and the lengthwise axis of the boom to less than 90° to also produce a change in said ratio of boom rolling motion versus boom lateral motion.

14. Apparatus for attaching a dual sectional boom to a supply airplane, comprising: a gimbal member mounted to support structure of the supply airplane for rotation about a fixed first elevation axis approximately parallel to the lateral axis of the supply airplane; said gimbal member connectably supporting an upper first section of the dual sectional boom for movement about an axis of azimuth relative to the supply airplane said axis of azimuth forming an included angle with the lengthwise axis of the first boom section; a lower second section of the dual boom being pivotally connected to the upper first section for movement about a second elevation axis approximately parallel to the first elevation axis, when the dual sectional boom is in a vertical plane alignment with the longitudinal axis of the supply airplane; said second elevation axis being substantially separated lengthwise along the boom from the first elevation axis and providing the interconnection forming the dual sectional boom arrangement; means for moving the lower second section of the boom about the second elevation axis to vary the angular alignment between the dual boom sections and change the angle of sweep between the dual boom sections, such that the upper first section projects into the airstream at a much higher angle of elevation, as measured down from a horizontal reference plane, than the lower second section; airfoil control surfaces connected to the lower second section of the boom for aerodynamically maneuvering the dual sectional boom in elevation and thereby rotating the azimuth axis about the first elevation axis and producing a change in the ratio of boom rolling motion versus boom lateral motion; and means for changing the included angle formed between the azimuth axis and the lengthwise axis of the boom to less than 90° to also produce a change in said ratio of boom rolling motion versus boom lateral motion.

15. A dual sectional aerial refueling boom for a tanker airplane, comprising: means for connecting an upper first section of the dual sectional boom to tanker airplane support surface for movement about a fixed first elevation axis approximately parallel to the lateral axis of the tanker airplane; interconnecting means mounted between said upper first boom surface and a lower second boom section for articulated movement of said second boom section about axes comprising, a second elevation axis approximately parallel to said first elevation axis, and a yaw axis for lateral movement of said second boom section relative to said first boom section; said yaw axis being at an angle less than 90° to the lengthwise axis of said second boom section; an actuator for downwardly inclining and positioning said first boom section with respect to the longitudinal axis of the tanker airplane; and airfoil means for aerodynamically maneuvering said second boom section both laterally and elevationally relative to said first boom section.

16. Aerial refueling apparatus for a tanker airplane, comprising: a dual sectional aerial refueling boom having an upper first section and a lower second section; aircraft support structure having means for connecting said first boom section for movement about a fixed first elevation axis approximately parallel to the lateral axis of the tanker airplane; a gimbal member mounted between said first and second boom sections for rotation about a second elevation axis fixed approximately parallel to the first elevation axis; said gimbal member connectably supporting the lower second section of the dual sectional boom for lateral movement relative to the tanker airplane about an azimuth axis; said azimuth axis being at an angle less than 90° to the lengthwise axis of said second boom section; means for varying the included angle formed between the lengthwise axis of said first boom section and the longitudinal axis of the tanker airplane; and means for aerodynamically maneuvering said second boom section relative to said first boom section.

17. Apparatus for attaching a dual sectional boom to a supply airplane, comprising: aircraft support structure having means for connecting an upper first section of the dual sectional boom for movement about a fixed first elevation axis approximately parallel to the lateral axis of the supply airplane; a lower second section of the dual sectional boom being pivotally connected to the upper first section for movement about axes comprising, a lateral axis for movement of said second boom section elevationally relative to the supply airplane, and a yaw axis for movement of said second boom section laterally relative to the supply airplane; said yaw axis being at an angle less than 90° to the lengthwise axis of said second boom section; means for actuating said first boom section about the fixed first elevation axis, to adjustably change its included angular position with respect to the longitudinal axis of the supply airplane; and means for aerodynamically maneuvering said second boom section both laterally and elevationally relative to said first boom section.

18. Aerial refueling boom articulation to a tanker airplane, comprising: a dual sectional aerial refueling boom comprising an upper first section and a lower second section; the upper first section being articulated to support structure of the tanker airplane for movement about a fixed horizontal axis for movement of the first boom section about a first elevation axis; the lower second section of the boom being articulated to the upper first section for movement about axes comprising, a horizontal axis for movement of the second boom section about a second elevation axis, and an azimuth axis for movement of the second boom section laterally relative to the tanker airplane; said azimuth axis being at an angle less than 90° to the lengthwise axis of said second boom section; means for actuating the upper first section of the boom to move it about the first elevation axis and alter the included angle formed between the lengthwise axis of said upper first section of the boom and the longitudinal axis of the tanker airplane; and means for aerodynamically moving the lower second section of the boom both laterally and elevationally relative to said upper first section of the boom.

19. Aerial refueling boom articulation for a tanker airplane, comprising: a dual sectional aerial refueling boom having an upper first section and a lower second section; said first boom section being connected to support structure of the tanker airplane for movement about a fixed first elevation axis approximately parallel to the lateral axis of the tanker airplane; the lower second section of the boom being articulated to the upper first section for movement about axes comprising, a second elevation axis approximately parallel to the first elevation axis when the dual section boom is in a vertical plane alignment with the longitudinal axis of the tanker airplane, and an azimuth axis for movement of the second boom section laterally relative to the tanker airplane; said azimuth axis being fixed at a predetermined angle less than 90° to the lengthwise axis of the second boom section; the combined section elevation axis and azimuth axis, being substantially separated lengthwise along the overall length of the dual sectional boom from the first elevation axis, and providing the interconnection forming the dual sectional boom arangement; means for actuating the upper first section of the boom about the first elevation axis to vary the angular alignment between the dual boom sections and change the angle of sweep between the dual boom sections such that the upper first section projects into the airstream at a much greater angle of elevation, as measured down from a horizontal reference plane, than the lower second section; and aerodynamic control surfaces mounted on the lower second section of the boom for maneuvering the lower second section of the boom both laterally and elevationally relative to the upper first section of the boom.

20. Aerial refueling apparatus for a supply airplane, comprising: a dual sectional aerial refueling boom having an upper first section and a lower second section; means for connecting said first boom section to support structure of the supply airplane for movement about a fixed first elevation axis approximately parallel to the lateral axis of the supply airplane; a gimbal member mounted beteen said first and second boom sections for articulated movement of said second boom section about a second elevation axis fixed approximately parallel to said first elevation axis when the dual sectional boom is in a vertical plane alignment with the longitudinal axis of the supply airplane; said gimbal member connectably supporting the lower second section of the dual sectional boom for lateral movement relative to said first boom section about an axis of azimuth; said axis of azimuth being fixed at a predetermined included angle of less than 90° with the lengthwise axis of said second boom section for producing a change in the ratio of boom rolling motion versus boom lateral motion as the lower second section of the dual sectional boom is moved in elevation relative to said first boom section; the connection of the second elevation axis and said axis of azimuth, being substantially spaced from the fixed first elevation axis relative to the overall length of the dual sectional boom, and forming the articulated interconnection between the dual sections of the boom; means for actuating the upper first section of the boom about the first elevation axis to vary the angular alignment between the dual boom sections such that the upper first section projects into the airstream at a much greater angle of elevation, as measured down from a horizontal reference plane, than the lower second section; and airfoil control surfaces mounted to the lower second section of the boom for aerodynamically maneuvering said second boom section both laterally and elevationally relative to the upper first section of the boom.

* * * * *